(12) United States Patent
Nilsson et al.

(10) Patent No.: US 11,190,256 B2
(45) Date of Patent: Nov. 30, 2021

(54) CONFIGURATION OF BEAMFORMING SETTINGS FOR A WIRELESS RADIO TRANSCEIVER DEVICE

(71) Applicant: TELEFONAKTIEBOLAGET LM ERICSSON (PUBL), Stockholm (SE)

(72) Inventors: Andreas Nilsson, Gothenburg (SE); Fredrik Athley, Kullavik (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/694,511

(22) Filed: Nov. 25, 2019

(65) Prior Publication Data

US 2020/0091985 A1 Mar. 19, 2020

Related U.S. Application Data

(63) Continuation of application No. 15/321,206, filed as application No. PCT/EP2016/079807 on Dec. 6, 2016, now Pat. No. 10,536,204.

(51) Int. Cl.
*H04B 7/06* (2006.01)
*H04W 16/28* (2009.01)
*H04W 72/04* (2009.01)

(52) U.S. Cl.
CPC ......... *H04B 7/0626* (2013.01); *H04B 7/0617* (2013.01); *H04B 7/0695* (2013.01); *H04W 16/28* (2013.01); *H04W 72/046* (2013.01)

(58) Field of Classification Search
CPC .............. H04B 7/0626; H04B 7/06174; H04B 7/0695; H04W 16/28; H04W 72/046
See application file for complete search history.

(56) References Cited

U.S. PATENT DOCUMENTS 9,362,991 B2 6/2016 Maltsev et al.
2008/0085681 A1 4/2008 Wang et al.
(Continued)

FOREIGN PATENT DOCUMENTS

RU 2599613 C1 10/2016
WO 2007084681 A1 7/2007

OTHER PUBLICATIONS

International Search Report and the Written Opinion of the International Searching Authority, issued in corresponding International Application No. PCT/EP2016/079807, dated Aug. 3, 2017, 12 pages.
(Continued)

*Primary Examiner* — David S Huang
(74) *Attorney, Agent, or Firm* — Rothwell, Figg, Ernst & Manbeck, P.C.

(57) ABSTRACT

There is provided mechanisms for configuring beamforming settings. A method is performed by a wireless radio transceiver device configured to communicate in directional beams. The method comprises obtaining a performance indication requiring configuration of the beamforming settings of the wireless radio transceiver device. The method comprises selecting a similarity measure objective based on what kind of performance indication was obtained. The method comprises determining, based on the similarity measure objective and results from a similarity measure procedure applied to pairs of received signals, an order in which to evaluate the directional beams when configuring the beamforming settings.

20 Claims, 4 Drawing Sheets

(56) References Cited

U.S. PATENT DOCUMENTS

| | | |
|---|---|---|
| 2011/0110453 A1 | 5/2011 | Prasad et al. |
| 2013/0301454 A1* | 11/2013 | Seol .................... H04B 7/0695 370/252 |
| 2014/0334566 A1 | 11/2014 | Kim et al. |
| 2016/0043781 A1 | 2/2016 | Cho et al. |
| 2016/0149652 A1 | 5/2016 | Huang et al. |
| 2017/0055187 A1 | 2/2017 | Kang et al. |
| 2018/0084585 A1 | 3/2018 | Lee et al. |

OTHER PUBLICATIONS

Search Report issued in Russian Application No. 2019120876, dated Nov. 25, 2019, 2 pages.

* cited by examiner

CONFIGURATION OF BEAMFORMING SETTINGS FOR A WIRELESS RADIO TRANSCEIVER DEVICE

TECHNICAL FIELD

Embodiments presented herein relate to a method, a wireless radio transceiver device, a computer program, and a computer program product for configuring beamforming settings.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for wireless radio transceiver devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the access node of the network and at the wireless radio transceiver devices might be required to reach a sufficient link budget.

The wireless radio transceiver devices could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless radio transceiver devices, different implementations will be needed.

When the wireless radio transceiver devices uses analog beamforming it could be challenging for the wireless radio transceiver devices to determine if a currently used beam produced by using the analog beamforming is a good beam in terms of a given signal quality criterion or if there exist other beams that if generated by the analog beamforming would perform significantly better in terms of the given signal quality criterion. In order to evaluate if any other such beam is better a beam finding procedures, for example using beam reference signals (BRS), could be used. However, performing such a procedure typically requires comparatively much overhead signaling between the access node and the wireless radio transceiver device which, thus, will temporarily occupy radio resources and increase the average interference in the network.

Hence, there is a need for an improved beam finding procedure.

SUMMARY

An object of embodiments herein is to enable efficient beam finding for a wireless radio transceiver device.

According to a first aspect there is presented a method for configuring beamforming settings. The method is performed by a wireless radio transceiver device configured to communicate in directional beams. The method comprises obtaining a performance indication requiring configuration of the beamforming settings of the wireless radio transceiver device. The method comprises selecting a similarity measure objective based on what kind of performance indication was obtained. The method comprises determining, based on the similarity measure objective and results from a similarity measure procedure applied to pairs of received signals, an order in which to evaluate the directional beams when configuring the beamforming settings.

Advantageously this provides efficient configuring of beamforming settings for the wireless radio transceiver device.

Advantageously this enables the wireless radio transceiver device to efficiently select which (combinations of) directional beams to be used when configuring the beamforming settings, thus resulting in a fast and efficient beam training procedure According to a second aspect there is presented a wireless radio transceiver device for configuring beamforming settings. The wireless radio transceiver device is configured to communicate in directional beams. The wireless radio transceiver device comprises processing circuitry. The processing circuitry is configured to cause wireless radio transceiver device to obtain a performance indication requiring configuration of the beamforming settings of the wireless radio transceiver device. The processing circuitry is configured to cause wireless radio transceiver device to select a similarity measure objective based on what kind of performance indication was obtained. The processing circuitry is configured to cause wireless radio transceiver device to determine, based on the similarity measure objective and results from a similarity measure procedure applied to pairs of received signals, an order in which to evaluate the directional beams when configuring the beamforming settings.

According to a third aspect there is presented a wireless radio transceiver device for configuring beamforming settings. The wireless radio transceiver device is configured to communicate in directional beams. The wireless radio transceiver device comprises processing circuitry and a storage medium. The storage medium stores instructions that, when executed by the processing circuitry, cause the wireless radio transceiver device to perform operations, or steps. The operations, or steps, cause the wireless radio transceiver device to obtain a performance indication requiring configuration of the beamforming settings of the wireless radio transceiver device. The operations, or steps, cause the wireless radio transceiver device to select a similarity measure objective based on what kind of performance indication was obtained. The operations, or steps, cause the wireless radio transceiver device to determine, based on the similarity measure objective and results from a similarity measure procedure applied to pairs of received signals, an order in which to evaluate the directional beams when configuring the beamforming settings.

According to a fourth aspect there is presented a wireless radio transceiver device for configuring beamforming settings. The wireless radio transceiver device is configured to communicate in directional beams. The wireless radio transceiver device comprises an obtain module configured to obtain a performance indication requiring configuration of the beamforming settings of the wireless radio transceiver device. The wireless radio transceiver device comprises a select module configured to select a similarity measure objective based on what kind of performance indication was obtained. The wireless radio transceiver device comprises a determine module configured to determine, based on the similarity measure objective and results from a similarity measure procedure applied to pairs of received signals, an order in which to evaluate the directional beams when configuring the beamforming settings.

According to a fifth aspect there is presented a computer program for configuring beamforming settings, the computer program comprising computer program code which, when run on a wireless radio transceiver device configured to communicate in directional beams, causes the wireless radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
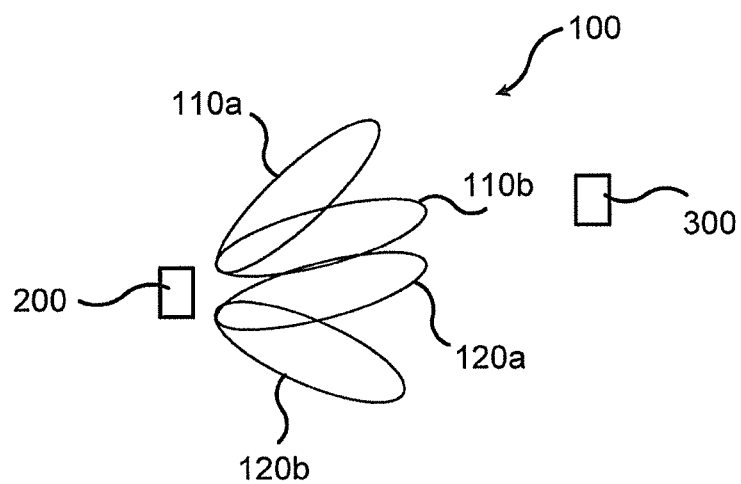
FIG. 1 is a schematic diagram illustrating a communications network according to embodiments.

FIG. 1 is a schematic diagram illustrating a communications network 100 comprising an access node 300 providing network access to a wireless radio transceiver device 200. The wireless radio transceiver device 200 is assumed to comprise at least two receiver chains and is configured to receive signals from the access node 300 in directional beams 110a, 110b, 120a, 120b. The wireless radio transceiver device 200 is thus configured to communicate in directional beams 110a, 110b, 120a, 120b (in contrast to omnidirectional beams).

The access node 300 could be any of a radio access network node, radio base station, base transceiver station, node B, evolved node B, g node B, or access point. The wireless radio transceiver device 200 could be any of a wireless device, mobile station, mobile phone, handset, wireless local loop phone, user equipment (UE), smartphone, laptop computer, tablet computer, or wireless sensor.

Figure 2:
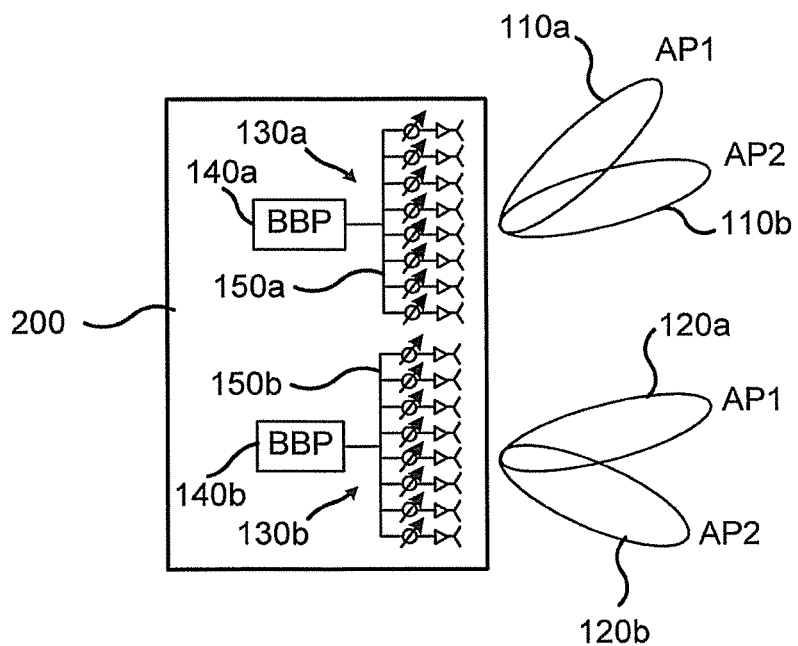
FIG. 2 schematically illustrates a wireless radio transceiver device according to an embodiment.

FIG. 2 illustrates the wireless radio transceiver device 200 according to an embodiment. The wireless radio transceiver device 200 is equipped with two receiver chains 130a, 130b, each comprising its own baseband processing (BPP) chain 140a, 140b. Each baseband processing chain 140a, 140b is operatively connected to its own analog beamformer 150a, 150b. Each analog beamformer 150a, 150b has its own set of analog precoder weights (e.g. defined by a codebook) by means of which the different directional beams 110a, 110b, 120a, 120b can be formed. For illustrative purposes it is assumed that receiver chain 130a is configured to receive transmissions from the access node 300 selectively in either directional beam 110a or directional beam 110b and that receiver chain 130b is configured to receive transmissions from the access node 300 selectively in either directional beam 120a or directional beam 120b. Hence, in the illustrative example of FIG. 2, each of the analog beamformers 150a, 150b switches between two analog precoders; AP1 for generating directional beams 110a, 120a and AP2 for generating directional beams 110b, 120b. Antennas at the wireless radio transceiver device 200 might be implemented in an irregular fashion and the physical structure of the wireless radio transceiver device 200 might affect the radiation patterns of the antennas, which means that the same analog precoder applied to two different analog beamformers 150a, 150b might create totally different radiation patterns, which is illustrated schematically in FIG. 2, where the directional beams 110a and 120a are pointing in mutually different directions and where the directional beams 110b and 120b are pointing in mutually different directions (assuming that the same analog precoder AP1 is applied at both analog beamformers 150a, 150b to generate directional beams 110a and 120a, and the same analog precoder AP2 is applied at both analog beamformers 150a, 150b to generate directional beams 110b and 120b).

The embodiments disclosed herein relate to mechanisms for configuring beamforming settings, i.e., which of the directional beams 110a, 110b, 120a, 120b to use for transmission to, and reception from, the access node 300. In order to obtain such mechanisms there is provided a wireless radio transceiver device 200, a method performed by the wireless radio transceiver device 200, a computer program product comprising code, for example in the form of a computer program, that when run on a wireless radio transceiver device 200, causes the wireless radio transceiver device 200 to perform the method.

Figure 3:
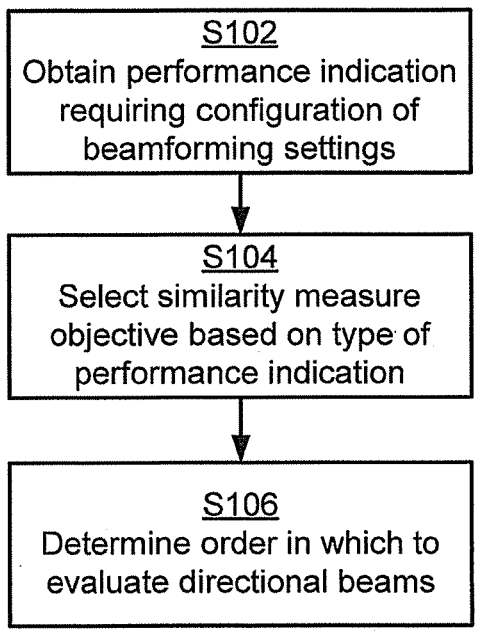
FIGS. 3, 4, and 5 are flowcharts of methods according to embodiments.
Figure 4:
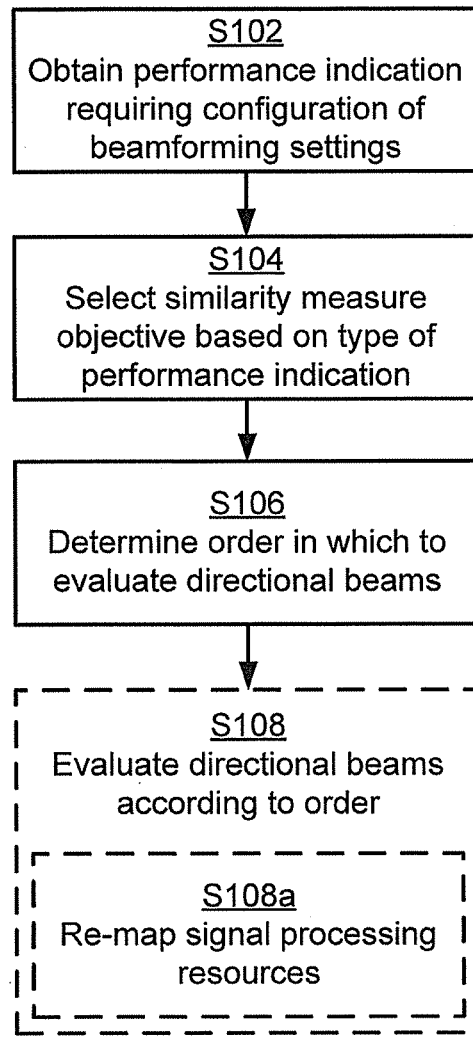

FIGS. 3 and 4 are flow charts illustrating embodiments of methods for configuring beamforming settings. The methods are performed by the wireless radio transceiver device 200. The methods are advantageously provided as computer programs 1020.

Reference is now made to FIG. 3 illustrating a method for configuring beamforming settings as performed by the wireless radio transceiver device 200 according to an embodiment. As disclosed above, the wireless radio transceiver device 200 is configured to communicate in directional beams 110a, 110b, 120a, 120b.

S102: The wireless radio transceiver device 200 obtains a performance indication requiring configuration of the beamforming settings of the wireless radio transceiver device 200. Examples of performance indications will be disclosed below.

By gathering statistics of received signals during for example active mode and/or dormant mode for the wireless radio transceiver device 200, a similarity measure can be determined between the analog precoders AP1, AP2 applied to the different analog beamformers 150a, 150b. Which similarity measure to use depends on the type of performance indication obtained in step S102. Hence, the wireless radio transceiver device 200 is configured to step S104:

S104: The wireless radio transceiver device 200 selects a similarity measure objective based on what kind of performance indication was obtained.

A result of a similarity measure procedure being applied to pairs of received signals is then used by the wireless radio transceiver device 200 to determine the order in which the directional beams 110a, 110b, 120a, 120b are to be evaluated when configuring the beamforming settings. Hence, the wireless radio transceiver device 200 is configured to step S106:

S106: The wireless radio transceiver device 200 determines, based on the similarity measure objective and results from a similarity measure procedure applied to pairs of received signals, an order in which to evaluate the directional beams 110a, 110b, 120a, 120b when configuring the beamforming settings. Examples of how the similarity measure objective and the results from the similarity measure procedure can be used to determine the order will be disclosed below.

In this respect not all directional beams 110a, 110b, 120a, 120b need to be evaluated when configuring the beamforming settings.

Referring back to the illustrative example of FIG. 2, the directional beam 110b (i.e., when using precoder AP2 for the upper beamformer 150a) is pointing in (substantially) the same direction as the directional beam 120a (i.e., when using AP1 for the lower beamformer 150b). Hence, for example, when collecting statistics of measured received signal strength values during long time periods the signal strength similarity resulting from applying the similarity measure procedure to the pair of signals received using directional beam 110b and directional beam 120a will be comparatively high. Assume further that the wireless radio transceiver device 200 is about to lose coverage and that a beam finding procedure therefore is initiated by the access node 300. In this case, it would thus be advantageous for the wireless radio transceiver device 200 to initially in the beam finding procedure not use a combination of beamformers 150a, 150b and precoders AP1, AP2 where AP2 is applied on the upper beamformer 150a and AP1 is applied on the lower beamformer 150b since this combination is likely to result in high signal strength similarity. In fact, it might be enough for the wireless radio transceiver device 200 to test either AP2 applied for the upper beamformer 150a or either AP1 applied for the lower beamformer 150b, but not both, because if AP2 applied for the upper beamformer 150a does not yield an acceptable received signal strength, most certainly neither AP1 applied for the lower beamformer 150b will yield an acceptable received signal strength. Instead, in this case, it could be more advantageous for the wireless radio transceiver device 200 to evaluate precoders with low signal strength similarity in order to as quickly as possible find a suitable directional beam, or combination of directional beams.

There may be different examples of received signals for the similarity measure procedure to be applied to. In general terms, the received signals could be either reference signals (such as channel state information reference signals (CSI-RS) or synchronization signals) or data signals. The received signals could thus be any signals received by the wireless radio transceiver device 200 from the access node 300 and hence no special reference signals dedicated particularly for the similarity measure procedure are needed.

Embodiments relating to further details of configuring beamforming settings as performed by the wireless radio transceiver device 200 will now be disclosed.

Reference is now made to FIG. 4 illustrating methods for configuring beamforming settings as performed by the wireless radio transceiver device 200 according to further embodiments. It is assumed that steps S102, S104, S106 are performed as described above with reference to FIG. 3 and a thus repeated description thereof is therefore omitted Once the wireless radio transceiver device 20 has determined the order in which to evaluate the directional beams 110a, 110b, 120a, 120b when the beamforming settings are configured the wireless radio transceiver device 200 could perform the evaluation. Hence, according to an embodiment the wireless radio transceiver device 200 is configured to perform step S108:

S108: The wireless radio transceiver device 200 evaluates the directional beams 110a, 110b, 120a, 120b according to the determined order (i.e., the order determined in step S106).

It is here to be understood that respective precoders AP1, AP2 need to be used in order to evaluate directional beams 110a, 110b, 120a, 120b. Hence, in this respect, evaluating the directional beams 110a, 110b, 120a, 120b is equivalent to evaluating the precoders AP1, AP2 per beamformer 150a, 150b.

There could be different ways for the wireless radio transceiver device 200 to change beamforming settings. According to some aspects, signal processing resources available in the radio transceiver device 200 are re-allocated during the evaluation of the directional beams 110a, 110b, 120a, 120b in step S108. Hence, according to an embodiment the radio transceiver device 200a comprises signal processing resources, and is configured to perform the evaluation of the directional beams 110a, 110b, 120a, 120b by performing step S108a:

S108a: The radio transceiver device 200a re-maps the signal processing to resources from one beam port to another beam port according to the determined order in which the directional beams 110a, 110b, 1200a, 120b are to be evaluated.

There may be different pairs of received signals to which the similarity measure procedure is applied.

In some aspects the similarity measure procedure is applied to pairs of signals received using mutually different beamformers 150a, 150b. Hence, according to an embodiment the radio transceiver device 200 comprises at least two receiver chains 130a, 130b, and the pairs of signals are received from mutually different ones of the at least two receiver chains 130a, 130b. Thereby correlation can be determined between signals from different beamformers 150a, 150b but same precoder AP1, AP2.

In some aspects the similarity measure procedure is applied to pairs of signals received using the same beamformer 150a, 150b. Hence, according to an embodiment the radio transceiver device 200 comprises at least one receiver chain 130a, 130b, and the pairs of signals are received from the same receiver chain 130a, 130b. Thereby, correlation can be determined between signals from the same beamformer 150a, 150b but different precoders AP1, AP2.

Further, the similarity measure procedure could be applied both to pairs of signals received using mutually different beamformers 150a, 150b and to pairs of signals received using the same beamformer 150a, 150b. As will be further disclosed below it could thus be preferred to determine a similarity measure both between analog precoders AP1, AP2 applied to different analog beamformers 150a, 150b and between analog precoders AP1, AP2 applied to the same analog beamformer 150a, 150b.

There could be different ways for the radio transceiver device 200 to determine whether to use pairs of signals received from same receiver chain 130a, 130b. In some aspects, signals received by the same analog beamformer 150a, 150b are only considered if the signals are received within the coherence time of the radio propagation channel in which the signals are received. Hence, according to an embodiment the signals are received on a radio channel having a coherence time, and signals of each pair of signals (that are received from the same receiver chain 130a, 130b) are received within the coherence time.

There could be different ways for the radio transceiver device 200 to determine the similarity measure of a pair of signals received from the same receiver chain 130a, 130b. In some aspects the similarity measure between precoders AP1, AP2 of the same analog beamformer 150a, 150b is found by comparing the similarity measure with precoders AP1, AP2 of another beamformer 150a, 150b. Hence, according to an embodiment the radio transceiver device 200 comprises at least two receiver chains 130a, 130b, and the similarity measure of a pair of signals received from same ones of the at least two receiver chains 130a, 130b is based on the similarity measure between each of the signals in the pair of signals with the same signal from another one of the at least two receiver chains 130a, 130b. This embodiment may be applicable for similarity measures based on signal strength but not on complex-valued similarity measures.

There may be different examples of similarity measures. According to an embodiment the similarity measure procedure determines correlation between the pairs of received signals.

As indicated above, the similarity measure could be related to signal strength similarity. In general terms, the similarity measure could either be related to signal strength similarity (considering only amplitude/envelope of the received signals) or complex-valued similarity (considering both phase and amplitude/envelope of the received signals). That is, according to a first embodiment the similarity measure procedure is evaluated in terms of signal strength similarity between the pairs of received signals. That is, according to a second embodiment the similarity measure procedure is evaluated in terms of complex-valued similarity between the pairs of received signals.

There may be different examples of similarity measure objectives to be selected in step S104. A first similarity measure objective is that the result of the similarity measure procedure being applied to pairs of received signals should be as high as possible. According to an embodiment the similarity measure objective is to evaluate the directional beams 110a, 110b, 120a, 120b according descending similarity measure results. That is, the order determined in step S106 orders the directional beams 110a, 110b, 120a, 120b from highest to lowest measure results. Using this similarity measure objective the directional beams 10a, 110b, 120a, 120b could then be evaluated in step S108 according descending similarity measure results.

A second similarity measure objective is that the result of the similarity measure procedure being applied to pairs of received signals should be as low as possible. According to an embodiment the similarity measure objective is to evaluate the directional beams 110a, 110b, 120a, 120b according ascending similarity measure results. That is, the order determined in step S106 orders the directional beams 110a, 110b, 1200a, 120b from lowest to highest similarity measure results. Using this similarity measure objective the directional beams 110a, 110b, 120a, 120b could then be evaluated in step S108 according ascending similarity measure results. For example, once the first two directional beams having the lowest similarity measure result have been tested, the next directional beam to be tested could be that of the remaining directional beams that has the lowest similarity measure result to the already tested directional beams, and so on.

There may be different performance indications for the wireless radio transceiver device 200 to obtain in step S102.

According to an embodiment the performance indication pertains to network coverage of the wireless radio transceiver device 200. The similarity measure objective could then be to span as large angular space as possible when evaluating the directional beams 110a, 110b, 120a, 120b. Hence, the order in step S106 is then determined such that as much as possible of the angular space is spanned using as few directional beams 110a, 110b, 120a, 120b as possible. Further, the similarity measure procedure can be evaluated in terms of signal strength similarity of the received signals. That is, the similarity measure procedure could be determined in terms of signal strength similarity when the performance indication pertains to network coverage and the similarity measure objective is to span as large angular space as possible.

According to an embodiment the performance indication pertains to bitrate of the wireless radio transceiver device 200. The similarity measure objective could then be to use as high rank as possible when evaluating the directional beams 110a, 110b, 120a, 120b. Hence, the order in step S106 is then determined such that as high rank as possible could be used using as few directional beams 110a, 110b, 120a, 120b as possible.

That is, according to a first embodiment the similarity measure procedure is evaluated in terms of signal strength similarity of the received signals and the similarity measure objective is be to evaluate the directional beams 110a, 110b, 120a, 120b according descending similarity measure results when the performance indication pertains to bitrate and when the similarity measure objective is to use as high rank as possible. One example of determining signal strength similarity is to evaluate the correlation of the total received signal strength over a certain bandwidth.

Further, according to a second embodiment the similarity measure procedure is evaluated in terms of complex-valued similarity of the received signals and the similarity measure objective is to evaluate the directional beams 110a, 110b, 120a, 120b according ascending similarity measure results when the performance indication pertains to bitrate and when the similarity measure objective is to use as high rank as possible.

If the similarity measure objective is to use as high rank as possible, the pairs of directional beams should have as high as possible signal strength similarity and as low as possible complex-valued similarity. That is, if the similarity measure objective is to use as high rank as possible, the directional beams 110a, 110b, 120a, 120b could be evaluated according to a joint function of descending signal strength similarity and ascending complex-valued to similarity.

As disclosed above, it could be preferred to determine a similarity measure both between analog precoders AP1, AP2 applied to different analog beamformers 150a, 150b and between analog precoders AP1, AP2 applied to the same analog beamformer 150a, 150b. This implies that it could be advantageous to measure the correlation of received signals for all different combination of analog beamformers 150a, 150b and analog precoders AP1, AP2. One reason for this is that two or more analog precoders AP1, AP2 applied to the same analog beamformer 150a, 150b might result in a large correlation of the received signals, and hence it might be enough to only use one of these highly correlated analog beamformers 150a, 150b during a beamfinding procedure. Estimating correlation between signals received using different precoders AP1, AP2 of different analog beamformers 150a, 150b could be accomplished by measuring, for example, signal strength at each respective receiver chain 130a, 130b simultaneously during normal operation of the wireless radio transceiver device 200.

In general terms, only one analog precoder AP1, AP2 can be used at a time for each analog beamformer 150a, 150b, and when the wireless radio transceiver device 200 changes analog precoder AP1, AP2 the radio propagation channel (excluding antenna patterns) might change as well. Therefore, it could be preferred to consider the coherence time of the radio propagation channel when determining the correlation between signals received using different analog precoders AP1, AP2 of the same analog beamformer 150a, 150b. For correlation of received signal strength, however, the correlation between analog precoders AP1, AP2 of the same analog beamformer 150a, 150b could be found also by comparing the correlation with analog precoders AP1, AP2 of another analog beamformer 150a, 150b. For example, assume that AP1 and AP2 for analog beamformer 150b has high correlation with AP2 of the analog beamformer 150a, then AP1 and AP2 of the analog beamformer 150b can be assumed to have strong correlation as well.

That is, in case the performance indication pertains to increasing the network coverage, preferably directional beams 110a, 110b, 120a, 120b with low signal strength correlation between them should be used first to span the angular space as quickly as possible. If the signal strength correlation is very high between two different combinations of analog precoders AP1, AP2 and analog beamformers 150a, 150b, it might be enough to use only one of the combinations during the beam finding procedure.

Further, in case the performance indication pertains to increasing the bitrate (due to low rank in the channel), it could be preferred to prioritize evaluation of analog precoders AP1, AP2 that have low complex-valued correlation whilst still having a strong signal strength correlation in order to facilitate spatial multiplexing.

Figure 5:
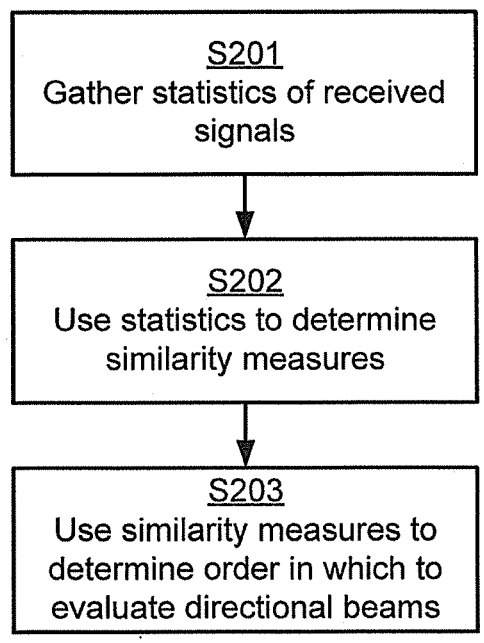

FIG. 5 is a flowchart of a particular embodiment for configuring beamforming settings, the method being performed by a wireless radio transceiver device 200 according to at least some of the above disclosed embodiments.

S201: The wireless radio transceiver device 200 gathers statistics of received signals during active mode and/or dormant mode for different combinations of analog precoders AP1, AP2 and analog beamformers 150a, 150b.

S202: The wireless radio transceiver device 200 uses the gather statistics to determine a similarity measure value (such as signal strength correlation or complex-valued correlation) of the received signals between the different combinations of analog precoders AP1, AP2 and analog beamformers 150a, 150b.

S203: The wireless radio transceiver device 200 uses the similarity measure value to determine which combinations of analog precoders AP1, AP2 and analog beamformers 150a, 150b that should be included in a beam training procedure and in which order the combinations of analog precoders AP1, AP2 and analog beamformers 150a, 150b should be used in a beam finding procedure.

Figure 6:
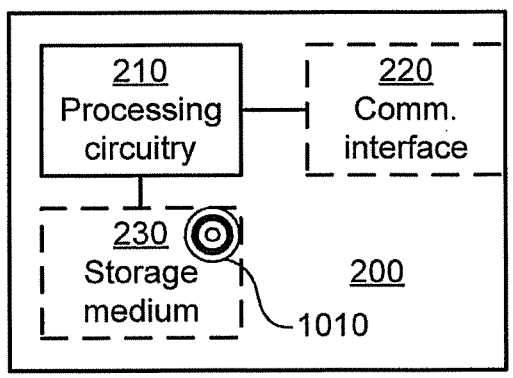
FIG. 6 is a schematic diagram showing functional units of a wireless radio transceiver device according to an embodiment.

FIG. 6 schematically illustrates, in terms of a number of functional units, the components of a wireless radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless radio transceiver device 200 to perform a set of operations, or steps, S102-S108a, S201-S203, as disclosed above. For example, the storage medium 230 may store the set of operations, and the processing circuitry 210 may be configured to retrieve the set of operations from the storage medium 230 to cause the wireless radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The wireless radio transceiver device 200 may further comprise a communications interface 220 at least configured for communications with the access node 300. As such the communications interface 220 may comprise one or more transmitters and receivers, comprising analogue and digital components. The processing circuitry 210 controls the general operation of the wireless radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the wireless radio transceiver device 200 are omitted in order not to obscure the concepts presented herein.

Figure 7:
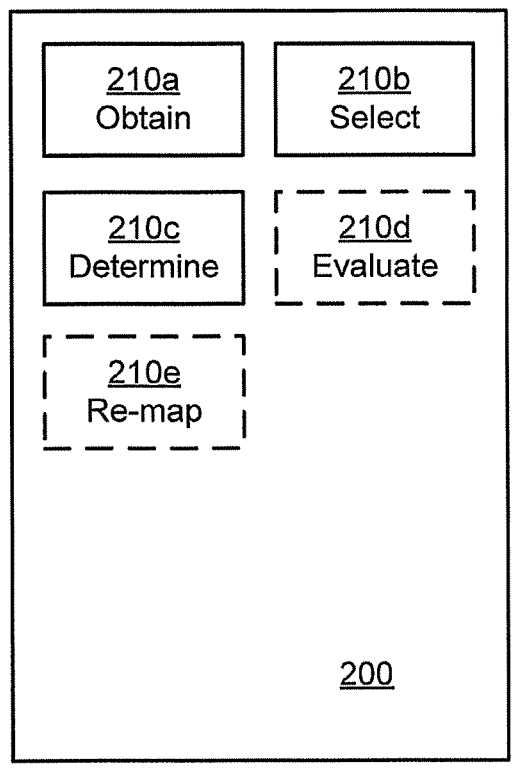
FIG. 7 is a schematic diagram showing functional modules of a wireless radio transceiver device according to an embodiment.

FIG. 7 schematically illustrates, in terms of a number of functional modules, the components of a wireless radio transceiver device 200 according to an embodiment. The wireless radio transceiver device 200 of FIG. 7 comprises a number of functional modules; a determine module 210a configured to perform step S102, a select module 210b configured to perform step S104, and a determine module 210c configured to perform step S106. The wireless radio transceiver device 200 of FIG. 7 may further comprise a number of optional functional modules, such as any of an evaluate module 210d configured to perform step S108, and a re-map module 210e configured to perform step S108a.

In general terms, each functional module 210a-210e may in one embodiment be implemented only in hardware and in another embodiment with the help of software, i.e., the latter embodiment having computer program instructions stored on the storage medium 230 which when run on the processing circuitry makes the wireless radio transceiver device 200 perform the corresponding steps mentioned above in conjunction with FIG. 7. It should also be mentioned that even though the modules correspond to parts of a computer program, they do not need to be separate modules therein, but the way in which they are implemented in software is dependent on the programming language used. Preferably, one or more or all functional modules 210a-210e may be implemented by the processing circuitry 210, possibly in cooperation with the communications interface 220 and/or the storage medium 230. The processing circuitry 210 may thus be configured to from the storage medium 230 fetch instructions as provided by a functional module 210a-210e and to execute these instructions, thereby performing any steps as disclosed herein.

Figure 8:
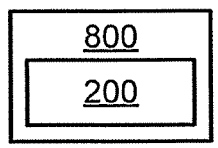
FIG. 8 schematically illustrates an access node according to an embodiment.
Figure 9:
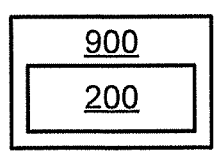
FIG. 9 schematically illustrates a wireless device according to an embodiment.

The radio transceiver device 200 may be provided as a standalone device or as a part of at least one further device. For example, the radio transceiver device 200 may be implemented in, part of, or co-located with, an access node 800 (as in FIG. 8) or a wireless device 900 (as in FIG. 9). Hence, according to some aspects there is provided an access node 800 and/or wireless device 900 comprising a radio transceiver device 200 as herein disclosed.

Further, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 6 the processing circuitry 210 may be distributed among a plurality of devices, or nodes. The same applies to the functional modules 210a-210e of FIG. 7 and the computer program 1020 of FIG. 10 (see below).

Figure 10:
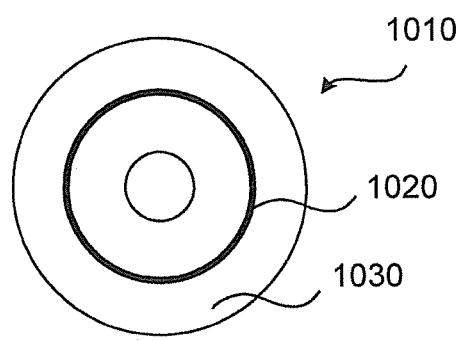
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product o11 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method of evaluating directional beams, the method being performed by a wireless radio transceiver device, the method comprising:
   receiving a first signal using a first directional beam;
   receiving a second signal using a second directional beam;
   determining a correlation between the received first signal and the received second signal; and
   based at least on the determined correlation, determining an order of evaluating directional beams including the first directional beam and/or the second directional beam, wherein
   the correlation between the received first signal and the received second signal corresponds to a similarity between at least one characteristic of the received first signal and at least one characteristic of the received second signal, and
   the similarity between said at least one characteristic of the received first signal and said at least one characteristic of the received second signal indicates how similar said at least one characteristic of the received first signal and said at least one characteristic of the received second signal are with respect to each other.

2. The method of claim 1, wherein the similarity between said at least one characteristic of the received first signal and said at least one characteristic of the received second signal is (i) signal strength similarity between the received first signal and the received second signal or (ii) complex-valued similarity between the received first signal and the received second signal.

3. The method of claim 1, wherein
   the wireless radio transceiver device comprises signal processing resources, and
   evaluating the directional beams comprises re-mapping the signal processing resources from one beam port to another beam port according to the determined order.

4. The method of claim 1, wherein
   the wireless radio transceiver device comprises a first receiver chain and a second receiver chain,
   the first directional beam is associated with the first receiver chain, and
   the second directional beam is associated with the second receiver chain.

5. The method of claim 1, wherein
the wireless radio transceiver device comprises at least one receiver chain,
the first directional beam is associated with said at least one receiver chain, and
the second directional beam is associated with said at least one receiver chain.

6. The method of claim 5, wherein the first signal and the second signal are received within a coherence time of a radio channel.

7. The method of claim 1, wherein
the wireless radio transceiver device comprises at least two receiver chains, and
a similarity measure of a pair of signals received from same ones of the at least two receiver chains is based on a similarity measure between each of the signals in the pair of signals with the same signal from another one of the at least two receiver chains.

8. The method of claim 1, further comprising:
obtaining a performance indication requiring configuration of beamforming settings of the wireless radio transceiver device; and
selecting a similarity measure objective based on the obtained performance indication, wherein
the order of evaluating the directional beams is determined further based on the selected similarity measure objective.

9. The method of claim 8, wherein the similarity measure objective is to evaluate the directional beams according to (i) descending similarity measure results or (ii) ascending similarity measure results.

10. The method of claim 8, wherein the performance indication pertains to (i) network coverage of the wireless radio transceiver device or (ii) bitrate of the wireless radio transceiver device.

11. The method of claim 8, wherein the similarity measure objective is (i) to span as large an angular space as possible when evaluating the directional beams or (ii) to use as high a rank as possible when evaluating the directional beams.

12. The method of claim 8, wherein the correlation between the received first signal and the received second signal corresponds to signal strength similarity of the received first signal and the received second signal when (i) the performance indication pertains to network coverage and (ii) the similarity measure objective is to span as large an angular space as possible.

13. The method of claim 8, wherein
the correlation between the received first signal and the received second signal corresponds to signal strength similarity of the received first signal and the received second signal, and
the similarity measure objective is to evaluate the directional beams according to descending similarity measure results when the performance indication pertains to bitrate and when the similarity measure objective is to use as high a rank as possible.

14. The method of claim 8, wherein
the correlation between the received first signal and the received second signal corresponds to complex-valued similarity of the received first signal and the received second signal, and
the similarity measure objective is to evaluate the directional beams according ascending similarity measure results when the performance indication pertains to bitrate and when the similarity measure objective is to use as high a rank as possible.

15. The method of claim 1, wherein evaluating the directional beams comprises using a beam finding procedure to select at least one beam from the directional beams based at least on a signal quality criterion.

16. The method of claim 1, wherein
the directional beams further include a third directional beam,
the order of evaluating the directional beams is evaluating the directional beams in a sequence of the first directional beam and a third directional beam,
the first directional beam and the third directional beam are not similar to each other, and
the first directional beam and the second directional beam are similar to each other.

17. A wireless radio transceiver device, the wireless radio transceiver device comprising:
processing circuitry;
a communication interface comprising a receiver, wherein the communication interface is configured to receive a first signal using a first directional beam and a second signal using a second directional beam; and
a storage medium storing instructions that, when executed by the processing circuitry, cause the wireless radio transceiver device to:
determine a correlation between the received first signal and the received second signal; and
based at least on the determined correlation, determine an order of evaluating directional beams including the first directional beam and/or the second directional beam, wherein
the correlation between the received first signal and the received second signal corresponds to a similarity between at least one characteristic of the received first signal and at least one characteristic of the received second signal, and
the similarity between said at least one characteristic of the received first signal and said at least one characteristic of the received second signal indicates how similar said at least one characteristic of the received first signal and said at least one characteristic of the received second signal are with respect to each other.

18. The wireless radio transceiver device of claim 17, wherein the instructions, when executed by the processing circuitry, further cause the wireless radio transceiver device to:
obtain a performance indication requiring configuration of beamforming settings of the wireless radio transceiver device; and
select a similarity measure objective based on the obtained performance indication, wherein
the order of evaluating the directional beams is determined further based on the selected similarity measure objective.

19. A computer program product comprising a non-transitory computer readable storage medium storing a computer program, the computer program comprising computer code which, when run on processing circuitry of a wireless radio transceiver device, causes the wireless radio transceiver device to:
determine a correlation between a first signal received at the wireless radio transceiver device using a first directional beam and a second signal received at the wireless radio transceiver device using a second directional beam; and based at least on the determined correlation, determine an order of evaluating directional beams including the first directional beam and/or the second directional beam, wherein the correlation between the received first signal and the received second signal corresponds to a similarity between at least one characteristic of the received first signal and at least one characteristic of the received second signal, and the similarity between said at least one characteristic of the received first signal and said at least one characteristic of the received second signal indicates how similar said at least one characteristic of the received first signal and said at least one characteristic of the received second signal are with respect to each other.

20. The computer program product of claim 19, wherein the computer code, when run on the processing circuitry of the wireless radio transceiver device, further causes the wireless radio transceiver device to:

obtain a performance indication requiring configuration of beamforming settings of the wireless radio transceiver device; and select a similarity measure objective based on the obtained performance indication, wherein the order of evaluating the directional beams is determined further based on the selected similarity measure objective.

\* \* \* \* \*

UNITED STATES PATENT AND TRADEMARK OFFICE
CERTIFICATE OF CORRECTION

PATENT NO.        : 11,190,256 B2  
APPLICATION NO.   : 16/694511  
DATED             : November 30, 2021  
INVENTOR(S)       : Nilsson et al.

Page 1 of 1

It is certified that error appears in the above-identified patent and that said Letters Patent is hereby corrected as shown below:

In the Specification

In Column 1, Line 4, below Title, insert -- CROSS REFERENCE TO RELATED APPLICATION(S) This application is a continuation of U.S. application Ser. No. 15/321,206, filed Dec. 22, 2016, now Pat. No. 10,536,204, which is a 35 U.S.C. § 371 National Phase Entry Application from PCT/EP2016/079807, filed Dec. 6, 2016, designating the United States. The disclosures of each of the referenced applications are incorporated herein in their entirety by reference. --.

In Column 6, Line 36, delete "device 20" and insert -- device 200 --, therefor.

In Column 6, Line 64, delete "processing to resources" and insert -- processing resources --, therefor.

In Column 6, Line 66, delete "1200$a$," and insert -- 120$a$, --, therefor.

In Column 8, Line 15, delete "beams 10$a$," and insert -- beams 110$a$, --, therefor.

In Column 8, Line 26, delete "1200$a$," and insert -- 120$a$, --, therefor.

In Column 9, Lines 18-19, delete "complex-valued to similarity." and insert -- complex-valued similarity. --, therefor.

In Column 12, Lines 1-2, delete "product o11" and insert -- product 1010 --, therefor.

Signed and Sealed this  
Twenty-eighth Day of February, 2023

Katherine Kelly Vidal  
*Director of the United States Patent and Trademark Office*